(12) United States Patent
Lacalle

(10) Patent No.: US 12,472,697 B2
(45) Date of Patent: Nov. 18, 2025

(54) METHOD AND APPARATUS FOR THERMOPLASTIC FILM WELDING

(71) Applicant: Rohr, Inc., Chula Vista, CA (US)

(72) Inventor: Javier Lacalle, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 164 days.

(21) Appl. No.: 18/231,587

(22) Filed: Aug. 8, 2023

(65) Prior Publication Data

US 2025/0050592 A1 Feb. 13, 2025

(51) Int. Cl.
*B29C 65/20* (2006.01)
(52) U.S. Cl.
CPC .................................. *B29C 65/20* (2013.01)
(58) Field of Classification Search
CPC ..... B29C 65/20; B29C 65/02; B29C 66/1122; B29C 66/1142; B29C 66/43; B29C 66/836; B29C 66/9241
USPC ....................................................... 156/157
See application file for complete search history.

(56) References Cited

U.S. PATENT DOCUMENTS

| | | |
|---|---|---|
| 2,457,659 A | 12/1948 | Graham |
| 4,668,316 A | 5/1987 | Sager |
| 4,931,126 A | 6/1990 | Mccarville |
| 5,464,488 A * | 11/1995 | Servin ............... B29C 66/81435 156/227 |
| 2010/0167060 A1 | 7/2010 | Matsuo |
| 2016/0167290 A1 | 6/2016 | Esser |
| 2016/0368202 A1 | 12/2016 | Crites |

FOREIGN PATENT DOCUMENTS

AU   2010325233 A1   6/2012

OTHER PUBLICATIONS

EP Search Report for EP Patent Application No. 24193589.9 dated Jan. 17, 2025.

* cited by examiner

*Primary Examiner* — James D Sells
(74) *Attorney, Agent, or Firm* — Getz Balich LLC

(57) ABSTRACT

A method of producing a continuous seam between first and second thermoplastic films is provided. The method includes disposing edge portions of first and second thermoplastic films adjacent to one another; disposing a joining process interface (JPI) layer adjacent to a surface of one of the edge portions; and using a heating and compaction device to produce a bonding between at least a portion of the edge portions, and using the heating and compaction device to apply a compaction force against the edge portions of the first and second thermoplastic films. The JPI layer is disposed between the heating and compaction device and the edge portions of the first and second thermoplastic films. At least one of the heating and compaction device and the first and second thermoplastic films are moved relative to the other to produce a continuous seam between the first thermoplastic film and second thermoplastic film.

20 Claims, 3 Drawing Sheets

METHOD AND APPARATUS FOR THERMOPLASTIC FILM WELDING

BACKGROUND OF THE INVENTION

1. Technical Field

The present disclosure relates to methods and apparatus for joining thermoplastic films together.

2. Background Information

Thermoplastic films may be used in the construction of composite structures. The thermoplastic film may be used as a base layer upon which subsequent layers are added to collectively form the composite structure. An example of such a composite structure is an aircraft nacelle, including fan cowl skins. In some instances, it is desirable or necessary to join a plurality of thermoplastic film tapes together to produce a single thermoplastic film. The joints between adjacent tape sections are typically continuously seamed. In some instances, the composite structure to be produced begins with a vacuum forming process that draws the thermoplastic film into the desired configuration. The vacuum process requires thermoplastic film tape joints that are air tight for a successful forming process. What is needed is a process of joining thermoplastic films that provides a high quality joint.

SUMMARY

According to an aspect of the present disclosure, a method of producing a continuous seam between a first thermoplastic film and a second thermoplastic film is provided. The method includes: disposing an edge portion of the first thermoplastic film adjacent to an edge portion of the second thermoplastic film; disposing a joining process interface (JPI) layer adjacent to a surface of at least one of the edge portion of the first thermoplastic or the edge portion of the second thermoplastic film; and using a heating and compaction device to produce a bonding between at least a portion of the edge portion of the first thermoplastic film and the edge portion of the second thermoplastic film, and using the heating and compaction device to apply a compaction force against the edge portion of the first thermoplastic film and the edge portion of the second thermoplastic film. The JPI layer is disposed between the heating and compaction device and the edge portion of the first thermoplastic film and the edge portion of the second thermoplastic film. At least one of the heating and compaction device and the first and second thermoplastic films are moved relative to the other to produce a continuous seam between the first thermoplastic film and second thermoplastic film.

In any of the aspects or embodiments described above and herein, the edge portions of the first and second thermoplastic films may be disposed in an overlapping configuration, or in an abutting configuration.

In any of the aspects or embodiments described above and herein, the heating and compaction device may be moved relative to the first and second thermoplastic films to produce the continuous seam between the first and second thermoplastic films.

In any of the aspects or embodiments described above and herein, the JPI layer may be maintained stationary with the first and second thermoplastic films.

In any of the aspects or embodiments described above and herein, the JPI layer may be thermally conductive.

In any of the aspects or embodiments described above and herein, the JPI layer may be configured to permit passage of an electromagnetic field generated by the heating and conduction device into the first and second thermoplastic films.

In any of the aspects or embodiments described above and herein, the JPI layer may be a metallic substrate having a thickness in the range of about one thousandth of an inch to about five thousandths of an inch.

In any of the aspects or embodiments described above and herein, the first and second thermoplastic films may be moved relative to the heating and compaction device to produce the continuous seam between the first thermoplastic film and the second thermoplastic film.

In any of the aspects or embodiments described above and herein, the JPI layer may be maintained stationary with the first and second thermoplastic films.

In any of the aspects or embodiments described above and herein, the compaction force applied against the edge portions of the first and second thermoplastic films may be directly applied to the JPI layer.

In any of the aspects or embodiments described above and herein, the heating and compaction device may be a single unit that is configured to produce the bonding between the at least a portion of the edge portion of the first thermoplastic film and the edge portion of the second thermoplastic film, and configured to apply the compaction force against the edge portion of the first thermoplastic film and the edge portion of the second thermoplastic film.

In any of the aspects or embodiments described above and herein, the heating and compaction device may include a first component configured to produce the bonding between the at least a portion of the edge portion of the first thermoplastic film and the edge portion of the second thermoplastic film, and a second component configured to apply the compaction force against the edge portion of the first thermoplastic film and the edge portion of the second thermoplastic film.

In any of the aspects or embodiments described above and herein, the edge portions of the first and second thermoplastic films are disposed in an overlapping configuration and a thermoplastic bonding interface layer is disposed between the edge portions of the first and second thermoplastic films.

In any of the aspects or embodiments described above and herein, the edge portions of the first and second thermoplastic films may be disposed in an abutting configuration, and a thermoplastic bonding interface layer may be disposed between the edge portions of the first and second thermoplastic films.

According to an aspect of the present disclosure, a system for producing a continuous seam between a first thermoplastic film and a second thermoplastic film is provided that includes a heating and compaction device, a joining process interface (JPI) layer, and a system controller. The heating and compaction device is configured to produce a bonding between edge portions of the first and second thermoplastic films, and configured to apply a compaction force against the edge portions of the first and second thermoplastic films. The JPI layer is configured to be disposed adjacent to a surface of at least one of the edge portion of the first thermoplastic film or the edge portion of the second thermoplastic film, and between the heating and compaction device and the edge portion of the first thermoplastic film and the edge portion of the second thermoplastic film. The system controller is in communication with the heating and compaction device and a non-transitory memory storing instructions. The instructions when executed cause the system controller to: control the heating and compaction device to produce the bonding between the edge portion of the first thermoplastic film and an edge portion of the second thermoplastic film; control the heating and compaction device to apply the compaction force against the edge portion of the first thermoplastic film and the edge portion of the second thermoplastic film; and control movement of at least the one of the heating and compaction device and the first and second thermoplastic films relative to one another to produce a continuous seam between the first and second thermoplastic film. The JPI layer is maintained stationary relative to the first and second thermoplastic films.

In any of the aspects or embodiments described above and herein, the instructions when executed may cause the system controller to control movement of the heating and compaction device relative to the first and second thermoplastic films.

In any of the aspects or embodiments described above and herein, the instructions when executed may cause the system controller to control movement of the first and second thermoplastic films relative to the heating and compaction device.

According to an aspect of the present disclosure, a method of producing a continuous seam between a first thermoplastic film and a second thermoplastic film is provided. The method includes: disposing an edge portion of the first thermoplastic film adjacent to an edge portion of the second thermoplastic film; and using a heating and compaction device to produce a bonding between at least a portion of the edge portion of the first thermoplastic film and the edge portion of the second thermoplastic film, and using the heating and compaction device to apply a compaction force against the edge portion of the first thermoplastic film and the edge portion of the second thermoplastic film. A joining process interface (JPI) layer is applied to a surface of the heating and compaction device so as to be disposed between the heating and compaction device and the edge portion of the first thermoplastic film and the edge portion of the second thermoplastic film. At least one of the heating and compaction device and the first thermoplastic film and second thermoplastic film are moved relative to the other to produce a continuous seam between the first thermoplastic film and second thermoplastic film.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
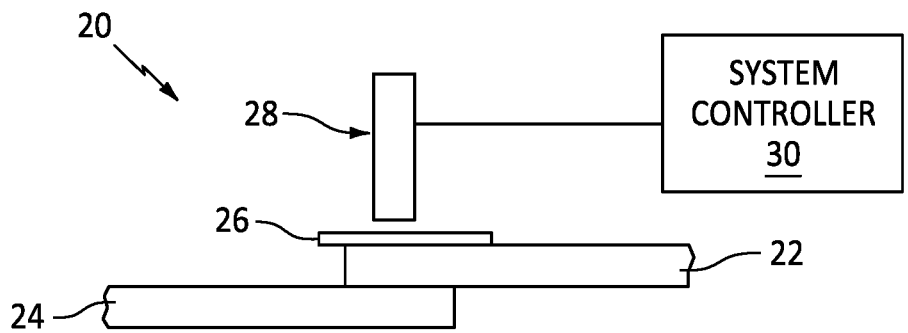
FIGS. 1-5 are diagrammatic views of a first thermoplastic component film, a second thermoplastic component film, a joining process interface layer, and a heating and compaction device according to embodiments of the present disclosure.
Figure 2:
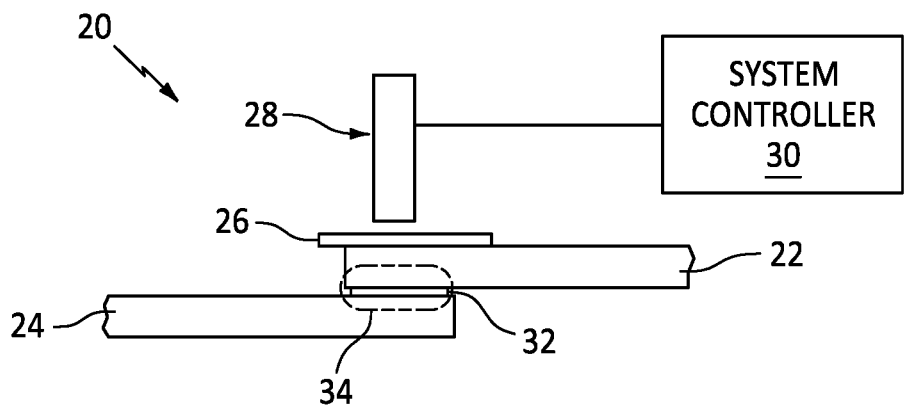
Figure 3:
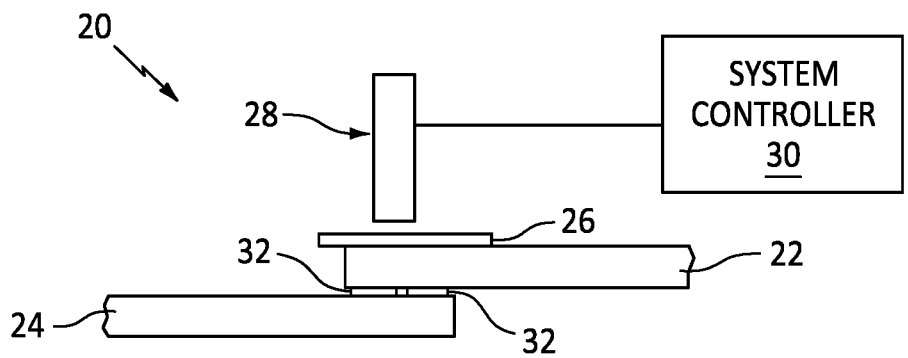
Figure 4:
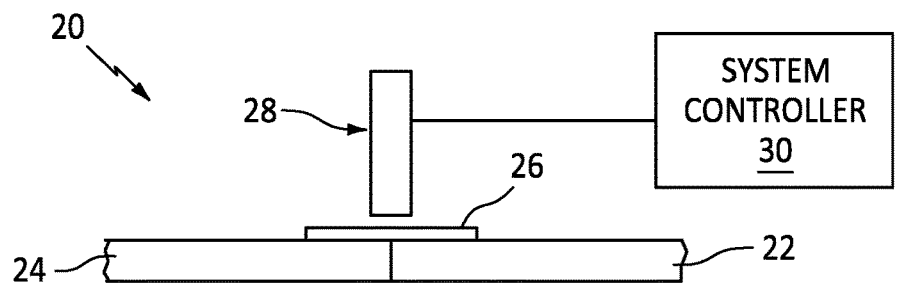
Figure 5:
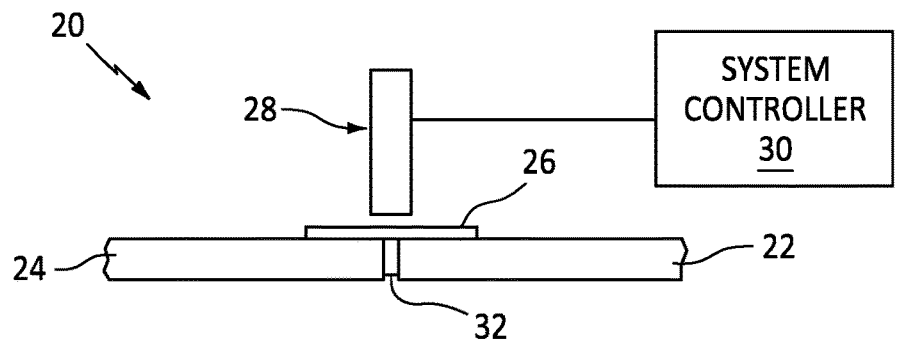

FIGS. 1-5 diagrammatically illustrate embodiments of the present disclosure system 20 as it may be used to join a first component film 22 and a second component film 24 along a continuous seam. The system 20 may include a joining process interface (JPI) layer 26 and a mechanism for producing thermal energy and for applying a compaction force to the first and second component films 22, 24 (hereinafter referred to as the "heating and compaction device 28"). In some embodiments, the present disclosure system 20 may include a system controller 30. In some embodiments, the first and second component films 22, 24 may be disposed in an overlapping relationship to form the seam; e.g., see FIGS. 1-3. In some embodiments, the first and second component films 22, 24 may be disposed in an abutting relationship (i.e., edge to edge, sometimes referred to as a "butt joint") to form the seam; e.g., see FIGS. 4 and 5. In some embodiments, the first and second component films 22, 24 may be disposed in direct contact ("contiguous") with one another. In the examples shown diagrammatically in FIGS. 1 and 4, the first and second component films 22, 24 are disposed contiguous with one another. In some embodiments, a bonding interface layer 32 may be disposed between the first and second component films 22, 24 at the interface therebetween. FIGS. 2 and 3 diagrammatically illustrate a bonding interface layer 32 disposed between the overlapping portions of the first and second component films 22, 24 and FIG. 5 diagrammatically illustrates a bonding interface layer 32 disposed between the abutting edges of the first and second component films 22, 24.

Figure 6:
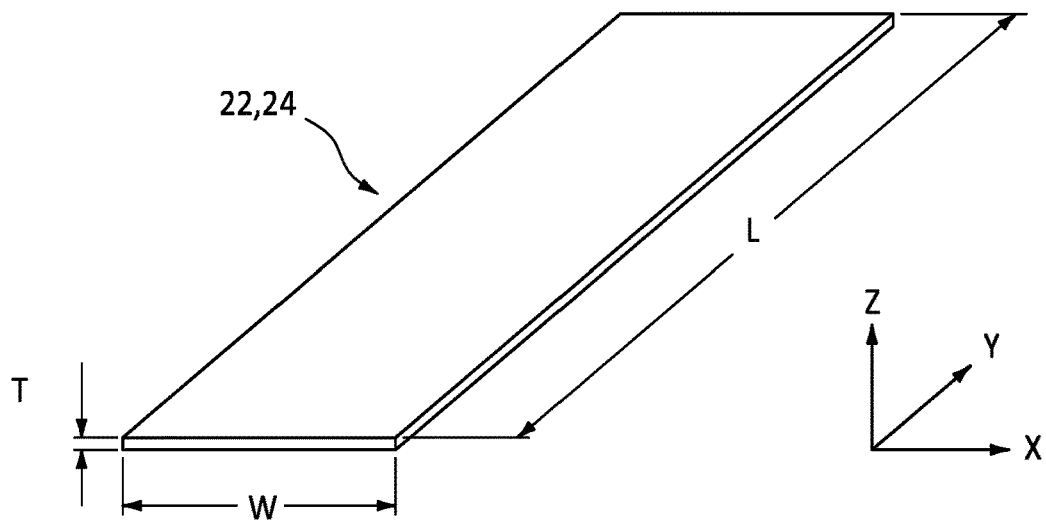
FIG. 6 is a diagrammatic view of a thermoplastic component film.

For explanation sake, each component film 22, 24 will be described herein as having a width ("W"—extending along an X-axis), a length ("L"—extending along a Y-axis), and a thickness ("T"—extending along a Z-axis) as diagrammatically shown in FIG. 6. The present disclosure is not limited to joining component films having any particular geometric configuration; e.g., the component film need not be a rectangular shape. The term "film" as used herein refers to a component body having a thickness in the range of about 0.03 mm to about 0.5 mm. The present disclosure is understood to provide considerable utility when used with films in the range of about 0.06 mm to about 0.3 mm. Often, the thickness and material of the component films 22, 24 is such that the component films 22, 24 are pliable and drapable at room temperature, but this is not required. Film pliability and drapability typically increase when the films 22, 24 are at a temperature above room temperature, approaching close to melting temperature.

The first and second component films 22, 24 may each have the same thickness, or the first component film 22 may have a first thickness and the second component film 24 may have a second thickness different from the first thickness.

The first and second component films 22, 24 may comprise the same thermoplastic material, or the first component film 22 may comprise a first thermoplastic material and the second component film 24 may comprise a second thermoplastic material different from the first thermoplastic material. The following are non-limiting examples of thermoplastic materials that be used in a thermoplastic component film: amorphous thermoplastics such as polyetherimide (PEI), polycarbonate (PC), polysulfone (PSU), polyethersulfone (PES), and the like, and semi-crystalline thermoplastics such as polyvinylidene fluoride (PVDF), polytetrafluoroethylene (PTFE), polyphenylene sulfide (PPS), polyetheretherketone (PEEK), polyetherketoneketone (PEKK), polyaryletherketone (PAEK)), and the like. The present disclosure is not limited to component films 22, 24 comprising any particular thermoplastic material.

The heating and compaction device 28 is configured to produce the energy required to bond (e.g., weld) the first and second component films 22, 24 together with one another and to apply an amount of compaction force to the first and second component films 22, 24 that facilitates the joining/bonding. In some embodiments, the heating and compaction device 28 may be a single device that is controllable to produce the bonding energy and to apply the requisite compaction force; e.g., a thermal conduction device or an electromagnetic (EM) inductor that is controllable to engage the component films 22, 24 with the desired force through the JPI layer 26 as will be detailed herein. FIGS. 1-5 diagrammatically illustrate a heating and compaction device 28 as a single device. In some embodiments, the heating and compaction device 28 may be a pair of devices (e.g., see FIG. 7), with a first device controllable to produce the bonding energy and a second device controllable to apply the desired compaction force. For example, the first device controllable to produce the bonding energy may be an ultrasonic device that includes an ultrasonic transducer that powers a sonotrode/horn, and the second device controllable to apply the compaction force may include one or more rollers that engage with the component films 22, 24 through the JPI layer 26. The present disclosure is not limited to any particular type or configuration of heating and compaction device 28 other than one that may be used in the manner described herein.

In some embodiments, the present disclosure may be configured to move the heating and compaction device 28 relative to the first and second component films 22, 24 during the joining process. In some embodiments, the present disclosure may be configured to move the first and second component films 22, 24 relative to the heating and compaction device 28 during the joining process. In some embodiments, the present disclosure may be configured to move the first and second component films 22, 24 and the heating and compaction device 28 concurrently relative to one another during the joining process as the seam is created. In some embodiments, the present disclosure may be configured to move the first and second component films 22, 24 relative to the heating and compaction device 28 during portions of the joining process, and to move the heating and compaction device 28 relative to the first and second component films 22, 24 during other portions of the joining process as the seam is created. The present disclosure is not limited to any particular movement arrangement for the heating and compaction device 28 and the component films 22, 24.

During the present disclosure joining process, the JPI layer 26 is disposed between the heating and compaction device 28 and the first and second component films 22, 24. For example, as shown in FIGS. 1-3, the JPI layer 26 may be disposed contiguous with one of the component films 22, 24 (e.g., FIGS. 1-3 illustrate the JPI layer 26 disposed contiguous with a portion of the first component film 22 during the bonding of overlapping component films 22, 24) or contiguous with both of the component films 22, 24; e.g., FIGS. 4 and 5 illustrate the JPI layer 26 disposed contiguous with a portion of the first component film 22 and a portion of the second component film 24 during the bonding of abutting component films 22, 24.

The JPI layer 26 is configured to cooperate with the heating and compaction device 28 to permit the heating and compaction device 28 to produce sufficient thermal energy to cause the first and second component films 22, 24 to bond (e.g., to be welded) with one another, and to permit the heating and compaction device 28 to apply an amount of compaction force to the first and second component films 22, 24 that facilitates the bonding. The characteristics of the JPI layer 26 may vary depending on the nature of the heating and compaction device 28. For example, if the heating and compaction device 28 directly produces the thermal energy needed for the bonding, the JPI layer 26 will be thermally conductive. The degree to which the JPI layer 26 is thermally conductive may be selected to suit the application. As another example, if the heating and compaction device 28 produces an electromagnetic (EM) field to create the bonding, the JPI layer 26 will be configured to not substantially impede the passage of the EM field into the first and second component films 22, 24. The degree to which the JPI layer 26 does not impede the passage of the EM field may be selected to suit the application. In some embodiments, the JPI layer 26 may be configured to facilitate the introduction of energy from the heating and compaction device 28 into the first and second component films 22, 24. For example, the JPI layer 26 may be configured to increase the uniformity/distribution of bonding energy in the bonding region of the first and second thermoplastic component films 22, 24. The distributive nature of the JPI layer 26 may permit a higher average temperature within the bonding region than would be possible in the absence of the JPI layer 26, and the higher temperature may increase the integrity of the bonding. Regardless of whether the temperature within the bonding region is higher, embodiments of the JPI layer 26 may be configured to distribute the bonding energy within the bonding region and thereby increase the uniformity of the bonding between the component films 22, 24. In a similar manner, some embodiments of the JPI layer 26 may be configured to distribute the compaction force more uniformly within the bonding region of the first and second component films 22, 24 to increase the uniformity of the bonding. In some instances, the JPI layer 26 may be configured to permit the compaction force to be applied for a greater period of time and thereby improve the bonding; e.g., the compaction force may be maintained after the applied bonding energy produces the bonding (e.g., the weld pool) which may improve bond uniformity throughout the bonding region as the bond region solidifies. The JPI layer 26 is also configured to mitigate tangential forces on the first and second component films 22, 24 in the bonding region during the bonding process that may occur due to the relative movement between the heating and compaction device 28 and the first and second component films 22, 24. The mitigation of tangential forces on the first and second component films 22, 24 in the bonding region is particularly beneficial in those instances wherein the first and second component films 22, 24 are thin, drapable films.

The functions of the present disclosure JPI layer 26, as described above, distinguish the JPI layer 26 from a conventional susceptor. Joining processes that use a susceptor, typically heat the susceptor via resistive heating or magnetically via hysteresis heating and the thermal energy required to create the bonding is provided by the susceptor. This is in contrast to the present disclosure wherein although the JPI layer 26 may be heated during the joining process, the energy to create the bonding between the first and second component films 22, 24 is introduced into the first and second component films 22, 24 via the heating and compaction device 28.

In some embodiments, the JPI layer 26 may be disposed to remain stationary relative to the first and second component films 22, 24. In some embodiments, the JPI layer 26 may be disposed to remain stationary relative to heating and compaction device 28.

Non-limiting examples of a JPI layer 26 include a metallic substrate, or a polyimide film (e.g., a Kapton™ film), or the like. The metallic substrate may have a thickness in the range of about one thousandth of an inch to about five thousandths of an inch. In those embodiments wherein a JPI layer 26 is a coating or surface treatment, the thickness of the JPI layer may be chosen in view of the coating or surface treatment.

In some embodiments, the JPI layer 26 may be configured to readily release from the first and/or second thermoplastic component films 22, 24 during the joining process. Non-limiting examples of a JPI layer 26 configured to readily release from a component films 22, 24 include, but are not limited to, a JPI layer 26 that includes a coating or surface treatment applied to a surface of the JPI layer 26 that is engaged with the component film(s) 22, 24 that is non-reactive with the component films 22, 24, or a JPI layer 26 comprising a material that is non-reactive with the component films 22, 24, or a JPI layer 26 that includes a release film attached to the surface of the JPI layer 26 that is engaged with the component film(s), or the like.

In those embodiments that include a bonding interface layer 32 disposed between the first and second component films 22, 24 at the interface therebetween, the bonding interface layer 32 comprises one or more thermoplastic materials. FIGS. 2 and 3 diagrammatically illustrate a bonding interface layer 32 disposed between the overlapping portions of the first and second component films 22, 24 and FIG. 5 diagrammatically illustrates an interface layer disposed between the abutting edges of the first and second component films 22, 24.

The bonding interface layer 32 may have a homogenous configuration (e.g., the same thermoplastic material throughout), or it may include a fibrous material distributed within a thermoplastic material matrix (e.g., discontinuous fibers), or it may include a plurality of sublayers with different materials. A non-limiting example of a bonding interface layer 32 with a plurality of sub-layers is one that includes a sub-layer comprising a mesh material, or a cloth material, or a screen material, or a layer of continuous fibers, or the like. The aforesaid fibrous material or sub-layer material may be electrically conductive, but is not required to be electrically conductive. Non-limiting examples of fiber material include ceramic, glass, metal, carbon, and the like. A non-limiting example of a screen material is one comprising a metallic material.

The bonding interface layer 32 is typically configured to be present solely in the region between the components 22, 24 where the joining of the components 22, 24 is desired; i.e., the "bond region" (e.g., see dashed line 34 in FIG. 2). The bonding interface layer 32 may be a single (i.e., unitary) body that is disposed throughout the bond region (e.g., see FIGS. 2 and 5), or it may be a plurality of independent segments (e.g., strips) disposed within the bond region (e.g., see FIG. 3). In some embodiments, the bonding interface layer 32 (as a unitary body or collectively as a plurality of strips) may be configured to occupy all or substantially all of the bond region prior to the joining process. In some embodiments, the bonding interface layer 32 (as a unitary body or collectively as a plurality of strips) may be configured to occupy all the bond region after the joining process.

Some embodiments of the present disclosure system 20 may include a system controller 30 in communication with other components within the system 20, such as the heating and compaction device 28, apparatus for moving the heating and compaction device 28 relative to the first and second thermoplastic component films 22, 24 during the joining process, or apparatus for moving the first and second component films 22, 24 relative to the heating and compaction device 28, or both, sensors, a display device, a data output device, a data input device, and the like. The system controller 30 may be in communication with these components to control and/or receive signals therefrom to perform the functions described herein. The system controller 30 may include any type of computing device, computational circuit, processor(s), CPU, computer, or the like capable of executing a series of instructions that are stored in memory. The instructions may include an operating system, and/or executable software modules such as program files, system data, buffers, drivers, utilities, and the like. The executable instructions may apply to any functionality described herein to enable the system 20 to accomplish the same algorithmically and/or coordination of system 20 components. The system controller 30 includes or is in communication with one or more memory devices. The present disclosure is not limited to any particular type of memory device, and the memory device may store instructions and/or data in a non-transitory manner. Examples of memory devices that may be used include read-only memory, random access memory, volatile memory, non-volatile memory, static memory, dynamic memory, flash memory, cache memory, and/or any device that stores digital information. Communications between the system controller 30 and other system components may be via a hardwire connection or via a wireless connection.

Figure 7:
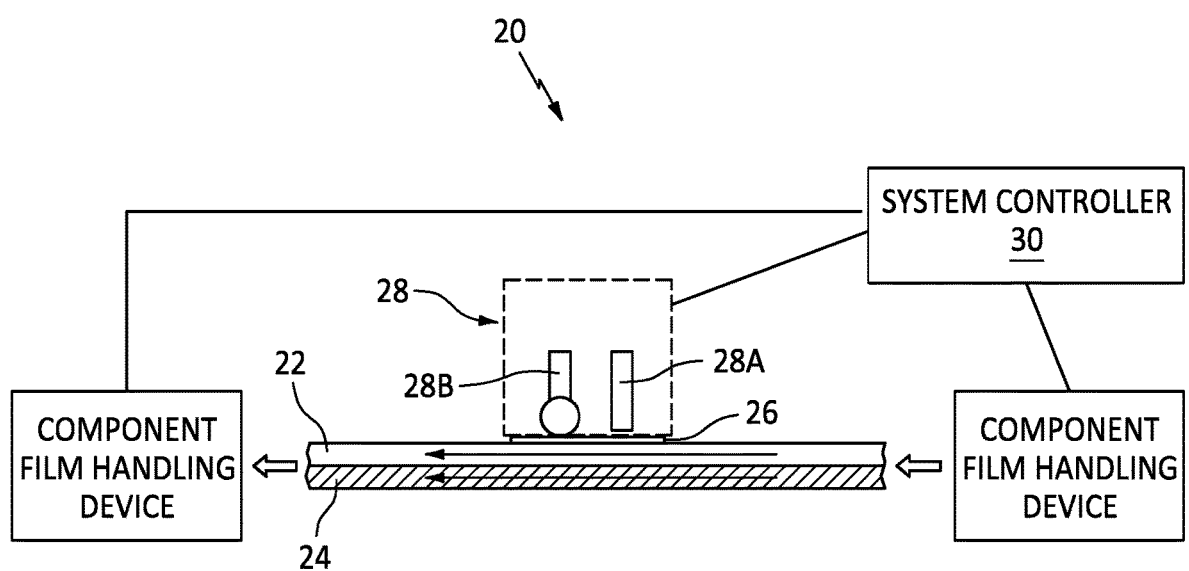
FIG. 7 is a diagrammatic view of a first thermoplastic component film, and a second thermoplastic component film, a joining process interface layer, a heating and compaction device, a system controller, and a film component handling device according to an embodiment of the present disclosure.

To illustrate the utility of the present disclosure, an example of a present disclosure method is described hereinafter. FIG. 7 diagrammatically illustrates a first component film 22 and a second component film 24 disposed in an overlapping configuration, a JPI layer 26, and a heating and compaction device 28. The heating and compaction device 28 is disposed above the first component film 22. The JPI layer 26 is disposed between the first component film 22 and the heating and compaction device 28. The JPI layer 26 is disposed contiguous with the exposed surface of the first component film 22. In this example, the JPI layer 26 and the heating and compaction device 28 are maintained generally stationary relative to the first and second component films 22, 24 and the first and second component films 22, 24 are moved in the direction shown by the arrows. Also in this example, the heating and compaction device 28 includes a heating component 28A (e.g., an induction heater, or an ultrasonic welding device, or the like) separate from a compaction force device 28B (shown diagrammatically as a roller).

During the joining process, the heating and compaction device 28 and the apparatus that moves the first and second component films 22, 24 may be controlled by the system controller 30; e.g., using stored instructions. In the events that sensors (e.g., temperature sensors, pressure sensors, current sensors, etc.) are used to sense aspects of the joining process, those sensors may also be in signal communication with the system controller 30.

The heating component 28A of the heating and compaction device 28 is controlled to produce an output sufficient for at least a portion of the first and second component films 22, 24 in the overlap region to bond with one another. For example, if the bonding is a welding process, then the heating component 28A is controlled to produce a weld pool that encompasses at least a portion of the first and second component films 22, 24 in the overlap region. The compaction force component 28B of the heating and compaction device 28 may be controlled (e.g., via stored instructions) to apply a compaction force to the overlap region of the first and second component films 22, 24. In some instances, intimate engagement between the opposing surfaces desirable during the bonding process may be impeded by various factors including relative positioning of the component films 22, 24, component film tolerances, component film surface irregularities, and the like. The compaction force component 28B may be controlled to apply a force to the overlap region of the films 22, 24 to mitigate such factors to achieve the aforesaid intimate contact. As the first and second component films 22, 24 are moved relative to the stationary heating and compaction device 28, the heating component 28A produces a weld pool that bonds the overlapped portions of the first and second component films 22, 24 and the compaction force component 28B compacts the weld pool to ensure intimate contact between the overlapped portions of the first and second component films 22, 24 prior to the weld pool cooling and the overlapped portions of the first and second component films 22, 24 resolidifying. In alternative embodiments, the upstream/downstream positions of the heating component 28A and the compaction force component 28B of the heating and compaction device 28 may be reversed; e.g., the compaction force component 28B may be used to create intimate contact between the overlapped portions of the first and second component films 22, 24 prior to the heating component 28A creating the weld pool.

As stated above, during the present disclosure joining process that produces a continuous seam between first and second component films 22, 24, the JPI layer 26 may provide several desirable functions and those functions may vary depending upon the type of heating and compaction device 28 used. For example, the JPI layer 26 may function to distribute thermal energy within the bonding region of the first and second component films 22, 24. A more uniform distribution of thermal energy within the bonding region is understood to improve the uniformity and/or integrity of the bonding between the components films 22, 24. Moreover, in some applications the thermally distributive nature of the JPI layer 26 may permit a higher average temperature within the bonding region and that may also improve the integrity of the bonding. In addition, embodiments of the JPI layer 26 may be configured to improve the application of compaction force within the bonding region; e.g., increased uniformity of applied compaction force, an ability to apply the compaction force for a greater period of time, and the like. Perhaps more significantly, in some embodiments the JPI layer 26 is configured to mitigate tangential forces on the first and second component films 22, 24 in the bonding region during that bonding process that may occur due to the relative movement between the heating and compaction device 28 and the first and second component films 22, 24. The mitigation/elimination of tangential forces on the first and second component films 22, 24 in the bonding region is particularly beneficial in those instances wherein the first and second thermoplastic component films 22, 24 are thin, drapable films.

In some present disclosure embodiments, the JPI layer 26 may be incorporated into an element of the heating and compaction device 28. For example, in these embodiments the JPI layer 26 may be incorporated into, disposed on, or applied to the surface of the heating and compaction device 28 that contacts the first and or second component films 22, 24. In those instances wherein the heating and compaction device 28 includes an independent compaction device (e.g., a roller), the JPI layer 26 may be incorporated into, disposed on, or applied to the surface of the compaction device.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A method of producing a continuous seam between a first thermoplastic film and a second thermoplastic film, comprising:
    disposing an edge portion of the first thermoplastic film adjacent to an edge portion of the second thermoplastic film;
    disposing a joining process interface (JPI) layer adjacent to a surface of at least one of the edge portion of the first thermoplastic film or the edge portion of the second thermoplastic film; and
    using a heating and compaction device to produce a bonding between at least a portion of the edge portion of the first thermoplastic film and the edge portion of the second thermoplastic film, and using the heating and compaction device to apply a compaction force against the edge portion of the first thermoplastic film and the edge portion of the second thermoplastic film to compact the edge portion of the first thermoplastic film and the edge portion of the second thermoplastic film;
    wherein the JPI layer is disposed between the heating and compaction device and the edge portion of the first thermoplastic film and the edge portion of the second thermoplastic film; and
    wherein at least the one of the heating and compaction device and the first thermoplastic film and second thermoplastic film are moved relative to the other to produce a continuous seam between the first thermoplastic film and second thermoplastic film.

2. The method of claim 1, wherein the edge portion of the first thermoplastic film and the edge portion of the second thermoplastic film are disposed in an overlapping configuration.

3. The method of claim 1, wherein the edge portion of the first thermoplastic film and the edge portion of the second thermoplastic film are disposed in an abutting configuration.

4. The method of claim 1, wherein the heating and compaction device is moved relative to the first thermoplastic film and the second thermoplastic film to produce the continuous seam between the first thermoplastic film and the second thermoplastic film.

5. The method of claim 4, wherein the JPI layer is maintained stationary with the first thermoplastic film and the second thermoplastic film.

6. The method of claim 5, wherein the JPI layer is thermally conductive.

7. The method of claim 5, wherein the JPI layer is configured to permit passage of an electromagnetic field generated by the heating and conduction device into the first thermoplastic film and the second thermoplastic film.

8. The method of claim 5, wherein the JPI layer is a metallic substrate having a thickness in the range of about one thousandth of an inch to about five thousandths of an inch.

9. The method of claim 1, wherein the first thermoplastic film and the second thermoplastic film are moved relative to the heating and compaction device to produce the continuous seam between the first thermoplastic film and the second thermoplastic film.

10. The method of claim 9, wherein the JPI layer is maintained stationary with the first thermoplastic film and the second thermoplastic film.

11. The method of claim 1, wherein the compaction force applied against the edge portion of the first thermoplastic film and the edge portion of the second thermoplastic film is directly applied to the JPI layer.

12. The method of claim 1, wherein the heating and compaction device is a single unit that is configured to produce the bonding between the at least a portion of the edge portion of the first thermoplastic film and the edge portion of the second thermoplastic film, and configured to apply the compaction force against the edge portion of the first thermoplastic film and the edge portion of the second thermoplastic film.

13. The method of claim 1, wherein the heating and compaction device includes a first component configured to produce the bonding between the at least a portion of the edge portion of the first thermoplastic film and the edge portion of the second thermoplastic film, and a second component configured to apply the compaction force against the edge portion of the first thermoplastic film and the edge portion of the second thermoplastic film.

14. The method of claim 1, wherein the edge portion of the first thermoplastic film and the edge portion of the second thermoplastic film are disposed in an overlapping configuration and a thermoplastic bonding interface layer is disposed between the edge portion of the first thermoplastic film and the edge portion of the second thermoplastic film.

15. The method of claim 1, wherein the edge portion of the first thermoplastic film and the edge portion of the second thermoplastic film are disposed in an abutting configuration, and a thermoplastic bonding interface layer is disposed between the edge portion of the first thermoplastic film and the edge portion of the second thermoplastic film.

16. A system for producing a continuous seam between a first thermoplastic film and a second thermoplastic film, comprising:
    a heating and compaction device configured to produce a bonding between an edge portion of the first thermoplastic film and an edge portion of the second thermoplastic film, and configured to apply a compaction force against the edge portion of the first thermoplastic film and the edge portion of the second thermoplastic film;
    a joining process interface (JPI) layer configured to be disposed adjacent to a surface of at least one of the edge portion of the first thermoplastic film or the edge portion of the second thermoplastic film, and between the heating and compaction device and the edge portion of the first thermoplastic film and the edge portion of the second thermoplastic film; and a system controller in communication with the heating and compaction device and a non-transitory memory storing instructions, which instructions when executed cause the system controller to:
control the heating and compaction device to produce the bonding between the edge portion of the first thermoplastic film and an edge portion of the second thermoplastic film;
control the heating and compaction device to apply the compaction force against the edge portion of the first thermoplastic film and the edge portion of the second thermoplastic film before or after the bonding between the edge portion of the first thermoplastic film and the edge portion of the second thermoplastic film is produced;
control movement of at least the one of the heating and compaction device and the first thermoplastic film and second thermoplastic film relative to one another to produce a continuous seam between the first thermoplastic film and second thermoplastic film; and
wherein the JPI layer is maintained stationary relative to the first thermoplastic film and second thermoplastic film.

17. The system of claim 16, wherein the instructions when executed cause the system controller to control movement of the heating and compaction device relative to the first thermoplastic film and the second thermoplastic film.

18. The system of claim 16, wherein the instructions when executed cause the system controller to control movement of the first thermoplastic film and the second thermoplastic film relative to the heating and compaction device.

19. A method of producing a continuous seam between a first thermoplastic film and a second thermoplastic film, comprising:

disposing an edge portion of the first thermoplastic film adjacent to an edge portion of the second thermoplastic film; and using a heating and compaction device to produce a bonding between at least a portion of the edge portion of the first thermoplastic film and the edge portion of the second thermoplastic film, and using the heating and compaction device to apply a compaction force against the edge portion of the first thermoplastic film and the edge portion of the second thermoplastic film to compact the edge portion of the first thermoplastic film and the edge portion of the second thermoplastic film;

wherein a joining process interface (JPI) layer is applied to a surface of the heating and compaction device so as to be disposed between the heating and compaction device and the edge portion of the first thermoplastic film and the edge portion of the second thermoplastic film; and wherein at least the one of the heating and compaction device and the first thermoplastic film and second thermoplastic film are moved relative to the other to produce a continuous seam between the first thermoplastic film and second thermoplastic film.

20. The method of claim 1, wherein the producing the bonding between the at least the portion of the edge portion of the first thermoplastic film and the edge portion of the second thermoplastic film is before the applying the compaction force against the edge portion of the first thermoplastic film and the edge portion of the second thermoplastic film, and the applying the compaction force against the edge portion of the first thermoplastic film and the edge portion of the second thermoplastic film is before the at least the portion of the edge portion of the first thermoplastic film and the edge portion of the second thermoplastic film resolidify from the bonding.

* * * * *